(No Model.)
T. W. MORAN.
Tire for Bicycles.
No. 235,552.  Patented Dec. 14, 1880.
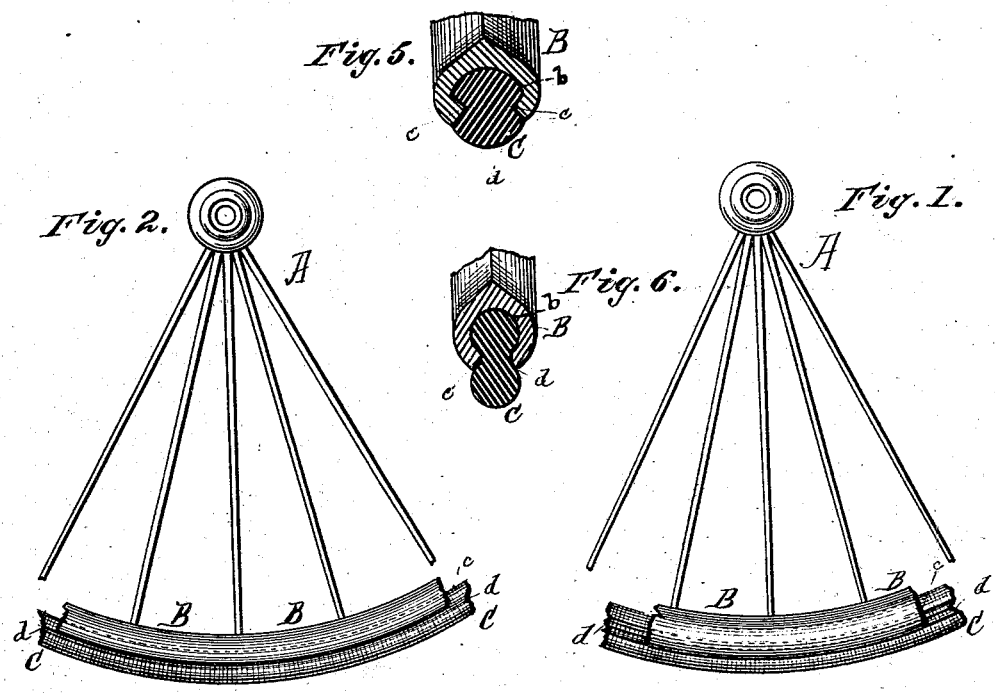

UNITED STATES PATENT OFFICE.

THOMAS W. MORAN, OF LOUISVILLE, KENTUCKY.

TIRE FOR BICYCLES.

SPECIFICATION forming part of Letters Patent No. 235,552, dated December 14, 1880.

Application filed June 5, 1880. (No model.)

*To all whom it may concern:*

Be it known that I, THOMAS W. MORAN, of Louisville, State of Kentucky, have invented certain new and useful Improvements Bicycles; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to certain new and useful improvements in tires for bicycle-wheels; and it consists in the construction and arrangement of parts, as will be hereinafter more fully set forth.

Figures 1 and 2 are side elevations. Figs. 3 and 4 are details in perspective, and Figs. 5 and 6 are details in section.

A represents the wheel; B, the rim or fellies of the wheel; C, the tire; $b$, the groove in the rim B. $c$ is the tongue or projection on the rim of the wheel; $d$, the groove in the side of the tire.

It has been common heretofore to make rubber tires for bicycle-wheels round, and to be sprung around the rim of the wheel and be cemented in a groove or cavity made therein. This method was found objectionable, for, in turning a sharp corner, the cement would not hold and the tire would pull out of the groove, throwing the machine down, to the great risk of the rider. It has also been common to provide two straight flanges on the tire and to spring a straight ring of rubber between them; but this is open to the same objections.

By this invention these objections are overcome. The use of cement is dispensed with, and by making the rim B with an oval cavity or groove, $b$, and a tongue, $c$, and constructing the tire of the form shown, and springing the same onto the rim, the tongues $c$ engage with the groove in the tire, and it is an impossibility to pull it out of position by turning a corner, however sharp it may be.

It will be obvious that both the machine and rider are benefitted by this improvement.

The tongue $c$ may be sharp, as shown in Fig. 5, or rounding, as shown in Fig. 6, the groove in the side of the tire being made to correspond.

I am aware that a rubber ring sprung between two flanges on the rim of a wheel is not new, and I do not claim such as my invention, as where such devices are used the flanges have no tongues, nor has the tire a groove to insure the positive retention of the ring upon the rim of the wheel.

Having thus fully described my invention, what I claim as new, and desire to secure by Letters Patent, is—

The wheel A, having the rim B, formed with an oval groove, $b$, and with tongues $c$ formed thereon, in combination with the tire C, having the groove $d$, whereby when the tire is placed in the groove in the rim it is securely held therein, substantially as set forth.

In testimony that I claim the foregoing as my own I have hereto affixed my signature in presence of two witnesses.

THOS. W. MORAN.

Witnesses:
B. F. D. FITCH,
L. R. McCLEERY.